United States Patent
Lee et al.

(10) Patent No.: US 10,409,547 B2
(45) Date of Patent: Sep. 10, 2019

(54) APPARATUS FOR RECORDING AUDIO INFORMATION AND METHOD FOR CONTROLLING SAME

(71) Applicant: LG ELECTRONICS INC., Seoul (KR)

(72) Inventors: Kyoungha Lee, Seoul (KR); Taeho Kim, Seoul (KR); Jeeyeon Kim, Seoul (KR); Inyoung Hwang, Seoul (KR); Kangmin Kim, Seoul (KR); Sungil Cho, Seoul (KR); Hanna Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 210 days.

(21) Appl. No.: 15/517,407

(22) PCT Filed: Oct. 15, 2014

(86) PCT No.: PCT/KR2014/009692
§ 371 (c)(1),
(2) Date: Apr. 6, 2017

(87) PCT Pub. No.: WO2016/060296
PCT Pub. Date: Apr. 21, 2016

(65) Prior Publication Data
US 2017/0300291 A1    Oct. 19, 2017

(51) Int. Cl.
*G10L 15/00* (2013.01)
*G06F 3/16* (2006.01)
(Continued)

(52) U.S. Cl.
CPC ............ *G06F 3/165* (2013.01); *G06F 16/433* (2019.01); *G06F 16/636* (2019.01);
(Continued)

(58) Field of Classification Search
CPC ..... G10L 15/22; G10L 15/063; G10L 21/028; G10L 2025/786; G10L 25/81; G10L 25/84; G10L 25/87
See application file for complete search history.

(56) References Cited

U.S. PATENT DOCUMENTS 6,567,775 B1 *   5/2003   Maali .................. G06K 9/6293
                                                    704/231
6,754,373 B1 *   6/2004   de Cuetos .......... G06K 9/00335
                                                    382/118
(Continued)

FOREIGN PATENT DOCUMENTS

KR    10-2011-0037115 A    4/2011
KR    10-2011-0095196 A    8/2011
(Continued)

OTHER PUBLICATIONS

B. Chen, M. Meguro, and M. Kaneko. "Probabilistic Integration of Audiovisual Information to Localize Sound Source in Human-Robot Interaction". Proceedings of the 2003 International Workshop on Robot and Human Interactive Communication, (2003).*

*Primary Examiner* — Edgar X Guerra-Erazo
(74) *Attorney, Agent, or Firm* — Birch, Stewart, Kolasch & Birch, LLP

(57) ABSTRACT

The present invention relates to an apparatus capable of recording audio information and a method for controlling the apparatus, the apparatus comprising: a display unit; an input unit for receiving an input of audio information; a detection unit for detecting at least one of a surrounding environment and a bio-signal; and a control unit for recording inputted audio information, extracting a keyword from the recorded audio information, generating image information on the basis of at least one of an analysis result of the recorded audio information and the detection result of the detection unit, and displaying tag information, in which the
(Continued)

keyword and the image information area combined, so as to correspond to the recorded audio information.

20 Claims, 8 Drawing Sheets

(51) Int. Cl.
- *G06F 16/432* (2019.01)
- *G06F 16/635* (2019.01)
- *G06F 16/683* (2019.01)
- *G06F 16/68* (2019.01)
- *G11B 20/10* (2006.01)
- *G11B 27/34* (2006.01)
- *G10L 15/26* (2006.01)

(52) U.S. Cl.
CPC .......... *G06F 16/683* (2019.01); *G06F 16/686* (2019.01); *G10L 15/26* (2013.01); *G11B 20/10527* (2013.01); *G11B 27/34* (2013.01)

(56) References Cited

U.S. PATENT DOCUMENTS

| | | | | |
|---|---|---|---|---|
| 6,959,276 | B2* | 10/2005 | Droppo | G10L 15/20 379/406.01 |
| 2004/0230420 | A1* | 11/2004 | Kadambe | G10L 15/07 704/205 |
| 2007/0038448 | A1* | 2/2007 | Sherony | G01S 5/0252 704/240 |
| 2009/0271188 | A1* | 10/2009 | Agapi | G10L 21/0208 704/233 |
| 2015/0112678 | A1* | 4/2015 | Binks | G10L 25/48 704/236 |
| 2016/0234595 | A1* | 8/2016 | Goran | H04R 3/002 |
| 2016/0283967 | A1* | 9/2016 | Mitchell | G06Q 30/0226 |

FOREIGN PATENT DOCUMENTS

| | | |
|---|---|---|
| KR | 10-2013-0124863 A | 11/2013 |
| KR | 10-2013-0129749 A | 11/2013 |
| KR | 10-2014-0029894 A | 3/2014 |

\* cited by examiner

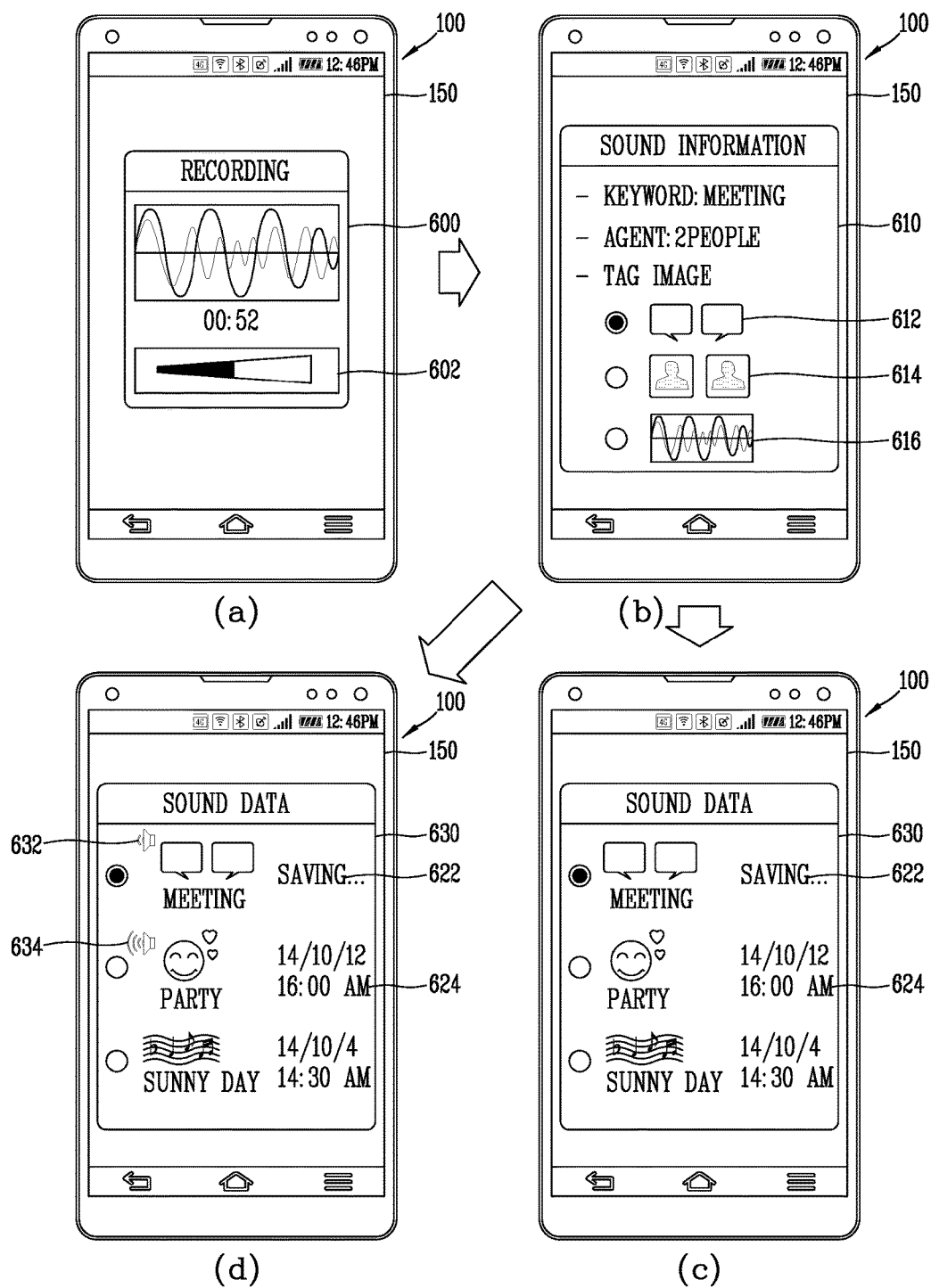

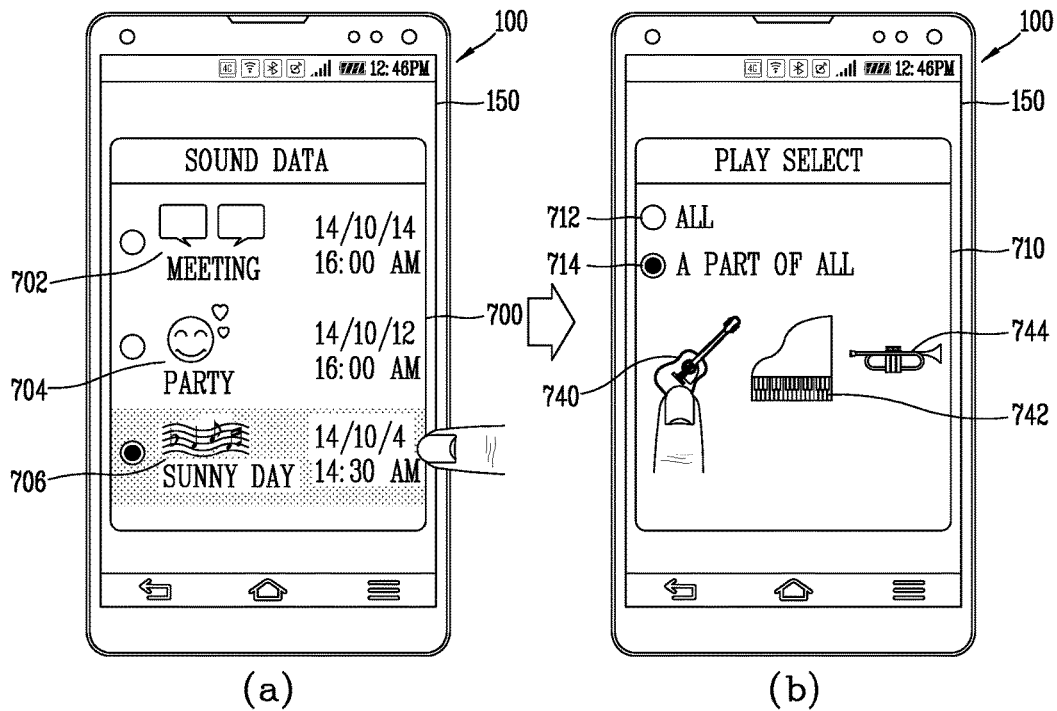
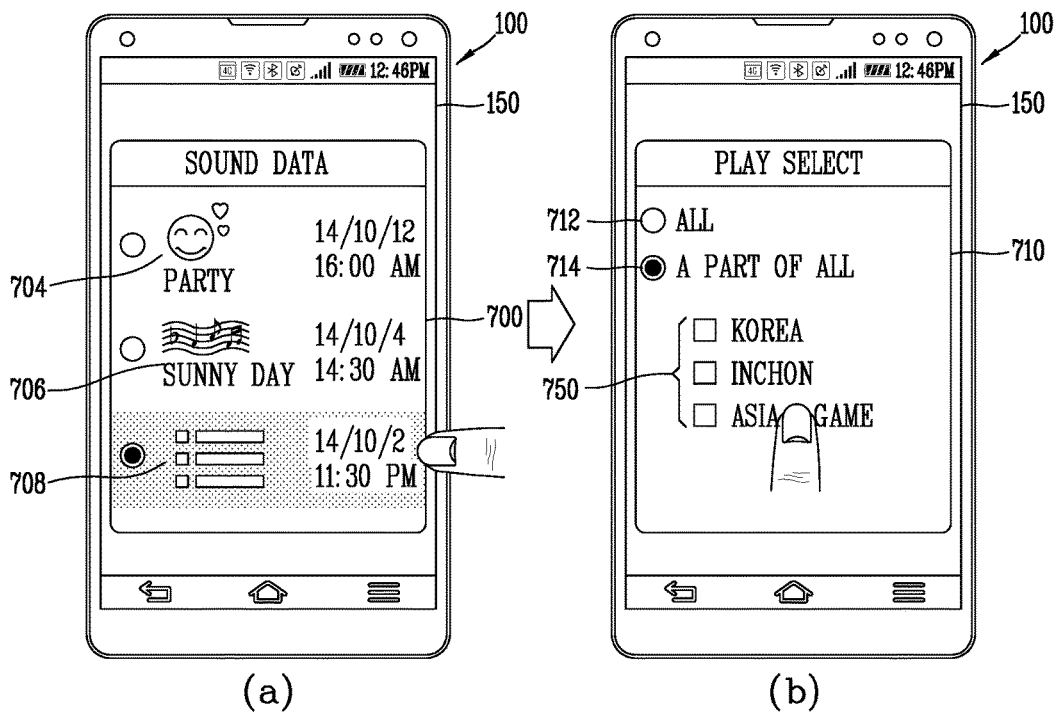

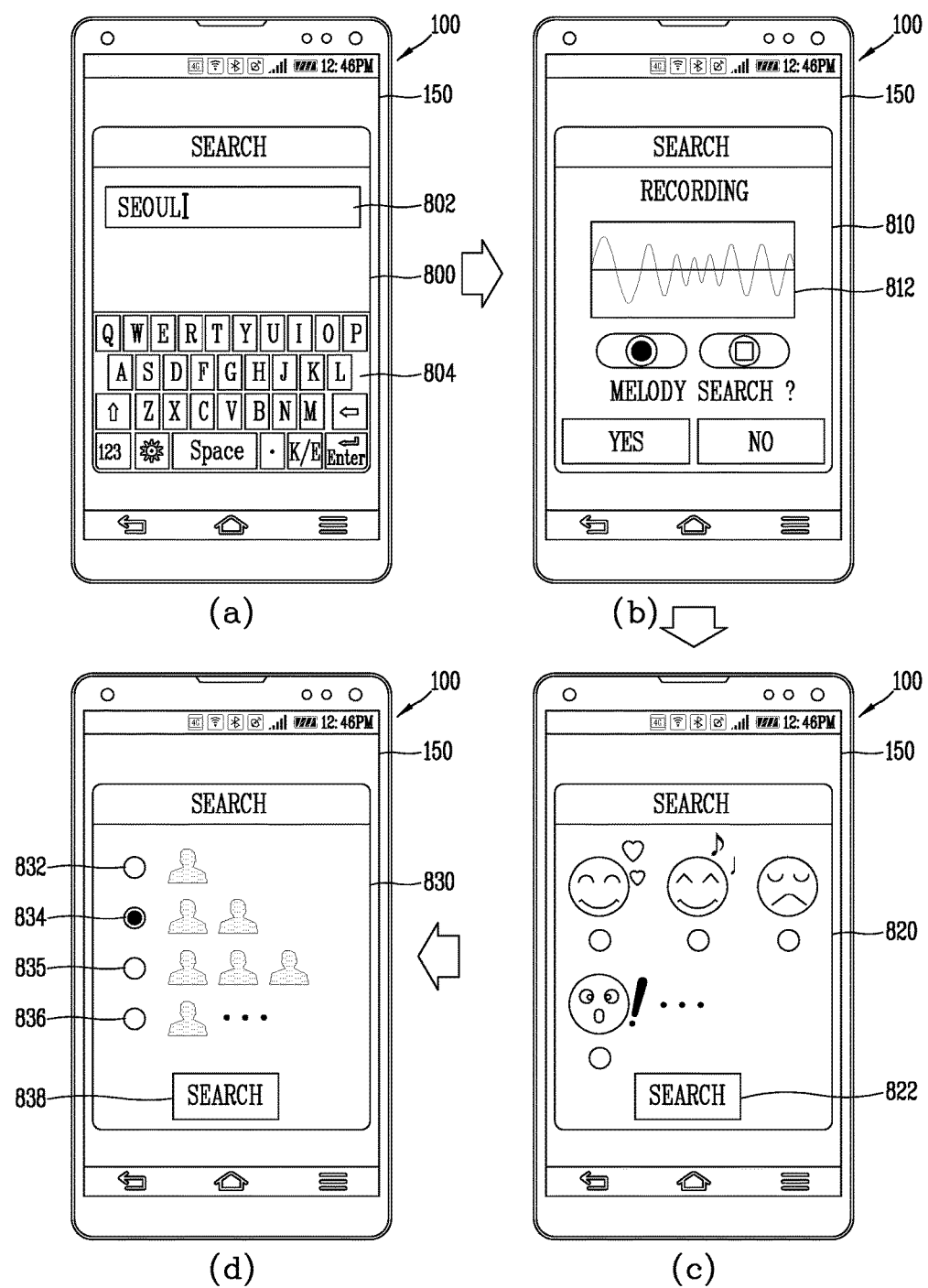

APPARATUS FOR RECORDING AUDIO INFORMATION AND METHOD FOR CONTROLLING SAME

CROSS REFERENCE TO RELATED APPLICATIONS

This application is the National Phase of PCT International Application No. PCT/KR2014/009692, filed on Oct. 15, 2014, which is hereby expressly incorporated by reference into the present application.

TECHNICAL FIELD

The present invention relates to an apparatus for recording audio information and a method for controlling the same.

BACKGROUND ART

Nowadays, many different devices with various multimedia features are being introduced with the development of technology. For instance, multimedia players are emerging which have complex features, such as taking pictures or video, playing music or video files, playing games, and receiving broadcasts.

These devices may have various features that deliver convenience to users. For example, if a user wants to take a note on an important matter at a meeting, etc., these devices may allow the user to use a voice memo feature to record it, which is much more accurate and convenience.

Thus, the user can record audio data they want, like a meeting, a melody, etc., at anytime and anywhere, and keep recorded audio data. In this regard, new methods are actively being worked on currently to allow the user to recognize and retrieve recorded audio data more easily and quickly.

DISCLOSURE OF THE INVENTION

Therefore, an object of the present invention is to provide an apparatus for recording audio information which allows a user to intuitively recognize recorded audio data and retrieve the audio data the user wants more quickly and easily, and a method for controlling the same.

Another object of the present invention is to provide an apparatus for recording audio information which allows a user to retrieve, select, and listen to the part the user wants from recorded audio data.

To achieve these and other advantages and in accordance with the purpose of the present invention, as embodied and broadly described herein, there is provided an apparatus for recording audio information, the apparatus comprising: a display unit; an input unit for receiving audio data; an output unit for outputting audio data; a sensing unit for detecting at least one between the surrounding environment and biological signals; and a controller that records received audio data, extracts a keyword from recorded audio data, generates image data based on at least one between the results of analyzing the recorded audio data and the results of detection by the sensing unit, and displays tags, created by combining the keyword and the image data, to correspond to the recorded audio data, wherein the controller recognizes the agents of audio signals included in the recorded audio data, displays on the display unit one or more different graphical objects corresponding to the different agents of audio signals, and extracts, from the recorded audio data, an audio signal coming from the agent corresponding to a selected one of the graphical objects and outputs the same.

In one embodiment, if the recorded audio data comprises a plurality of human voices, the graphical objects comprise at least one human-shaped graphical object, at least one speech-bubble-shaped graphical object, or at least one frequency wave-shaped graphical object, and if one is selected from among the human-shaped graphical object, the speech-bubble-shaped graphical object, and the frequency wave-shaped graphical object, the controller extracts the voice of a person corresponding to the selected graphical object from the audio data and outputs the same.

In one embodiment, the controller distinguishes the agents of a plurality of audio signals in the audio data from one another by the unique timbres and characteristics, and the agents of the audio signals comprise at least one person or musical instrument that generates a voice or sound that is distinguishable by the unique timbres and characteristics.

In one embodiment, the controller extracts the keyword in different ways depending on the type of the recorded audio data, using the results of analysis of the audio data.

In one embodiment, if the results of analysis of the audio data show that the audio data comprises a melody with a certain rhythm, the controller extracts the title of the melody as the keyword for the audio data through a music search.

In one embodiment, if the results of analysis of the audio data show that the audio data comprises the voice of at least one person, the controller recognizes the recorded audio data as a text string through voice-to-text (VTT) processing and extracts the keyword from the text string.

In one embodiment, if a word occurs more than a certain number of times or most frequently in the text string, the controller extracts the word as the keyword.

In one embodiment, if the text string contains a preset specific word or phrase, the controller extracts the specific word or phrase as the keyword.

In one embodiment, if the text string contains at least one user-specified word, the controller extracts a representative word corresponding to the at least one word as the keyword.

In one embodiment, if the time of recording the audio data and the current location match a time and location in stored schedule information, the controller extracts the keyword based on the stored schedule information.

In one embodiment, the controller generates image data comprising one or more different graphical objects according to the type of the recorded audio data determined by the result of analysis of the audio data, wherein the type of the audio data is determined according to whether the audio data comprises a plurality of human voices or a melody with a certain rhythm.

In one embodiment, if the recorded audio data comprises a plurality of human voices, the controller generates image data comprising at least one human-shaped graphical object, at least one speech-bubble-shaped graphical object, or at least one frequency wave-shaped graphical object.

In one embodiment, the controller generates image data comprising as many graphical objects as the number of agents of the voices recognized from the recorded audio data.

In one embodiment, if there is a distinguishable voice among the plurality of human voices included in the recorded audio data, the controller recognizes the person corresponding to that voice and displays an image corresponding to the recognized person through a graphical object.

In one embodiment, the controller determines the user's emotional state during recording of the audio data, using the results of detection by the sensing unit, and the image data comprises a graphical object corresponding to the determined emotional state of the user.

In one embodiment, the controller detects the current location where the audio data is being recorded, extracts information related to the location as the keyword, and displays a tag comprising a graphical object corresponding to the detected location.

In one embodiment, upon receiving search data, the controller retrieves audio data corresponding to the received search data, wherein the search data is one among text, recorded audio data, the user's emotional state, and the current location.

In one embodiment, the search data further comprises data on the number of human voices, and the controller retrieves audio data comprising a specific number of human voices based on the search data, among stored audio recordings comprising a plurality of human voices.

In one embodiment, the image data comprises a graphical object for displaying the recording volume level of the audio data.

To achieve these and other advantages and in accordance with the purpose of the present invention, as embodied and broadly described herein, there is provided a method for controlling an audio information recording apparatus, the method comprising: recording audio data and detecting at least one between the surrounding environment and biological signals; extracting a keyword by analyzing the recorded audio data and recognizing the agents of audio signals included in the audio data; generating image data using at least one among the detected surrounding environment the detected biological signals, and the recognized agents of audio signals; displaying tags comprising the generated image data and the extracted keyword to correspond to the recorded audio data; and when one of the tags is selected, outputting corresponding audio data, wherein the outputting of audio data comprises extracting, from the audio data, an audio signal corresponding to one selected from among the recognized agents of audio signals and outputting the same.

The apparatus for recording audio information and method for controlling the same according to the present invention offer the following advantages.

According to at least one of the embodiments of the present invention, the user is able to intuitively recognize recorded audio data since a keyword is extracted from the recorded audio data and tags for the recorded audio data are created by using the extracted keyword and image data created from the keyword.

According to at least one of the embodiments of the present invention, the user is able to selectively listen to at least part of the recorded audio data since the recorded audio data is sorted according to a preset criterion.

BRIEF DESCRIPTION OF THE DRAWINGS

FIG. 6 is an illustration of an example in which the audio information recording apparatus according to the exemplary embodiment of the present invention displays recorded audio data along with image data;

FIGS. 7A, 7B, 7C, and 7D illustrate examples in which the audio information recording apparatus according to the exemplary embodiment of the present invention displays graphical objects corresponding to a part of recorded audio data and plays that part of the recorded audio data; and FIG. 8 illustrates examples of search data input by the user, in the audio information recording apparatus according to the exemplary embodiment of the present invention.

MODES FOR CARRYING OUT THE PREFERRED EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

An apparatus for recording audio information in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a flexible glass display apparatus (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

FIG. 1A is a block diagram for describing an apparatus for recording audio information according to an embodiment of the present invention.

Figure 1:
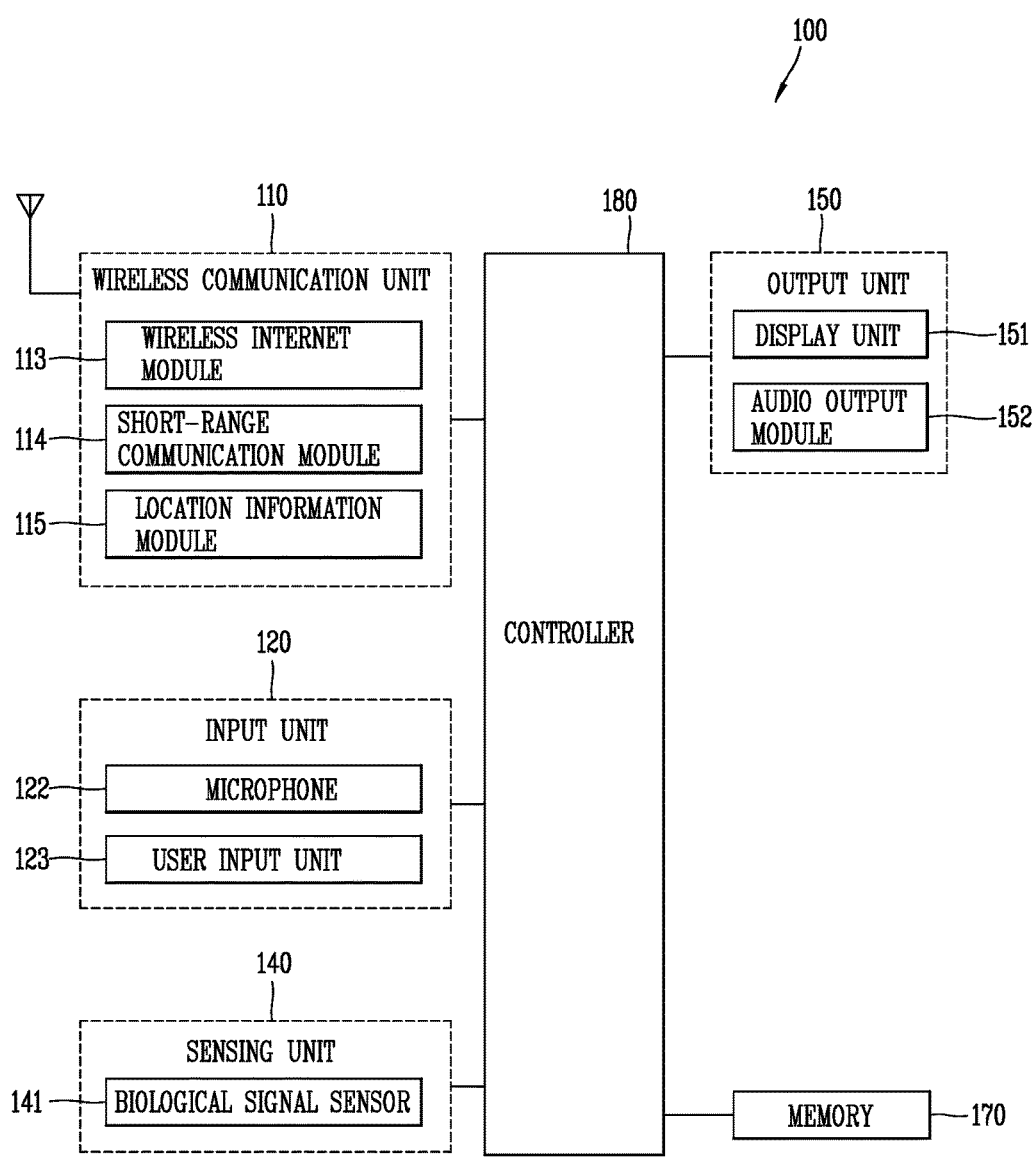
FIG. 1 is a block diagram for explaining an audio information recording apparatus according to the present invention.

The apparatus for recording audio information 100 is shown having components such as a wireless communication unit 110, an input unit 120, a sensing unit 140, an output unit 150, a memory 170, a controller 180, etc. And the apparatus for recording audio information 100 may further include a wireless communication unit 110. It is understood that implementing all of the illustrated components shown in FIG. 1 is not a requirement, and that greater or fewer components may alternatively be implemented.

More specifically, among the above components, the sensing unit 140 may include at least one sensor for sensing a user's biological signals. For example, the sensing unit 140 may include at least one among a heartbeat sensor for measuring the user's heart rate, a thermometer for checking the user's body temperature, and a sphygmomanometer for measuring the user's blood pressure and blood flow. Moreover, the controller 180 may combine and utilize information sensed by at least two of the sensors of the sensing unit 140.

The output unit 150 is for producing audio and visual outputs, and may include a display unit 151 and an audio output module 152. The display unit 151 may be interlayered or integrated with a touch sensor to implement a touch screen. Such a touch screen may function as a user input unit 123 that provides an input interface between the audio information recording apparatus 100 and the user, and at the same time may provide an output interface between the audio data recorder 100 and the user. The audio output unit 150 may include a component (e.g., speaker) for outputting audio data. Moreover, the audio output unit 150 may output the audio data as audible sound through this component.

The input unit 120 may include a microphone 122 or an audio input unit for inputting an audio signal, and a user input unit 123 (for example, a touch key, a push key, a mechanical key, and the like) for allowing a user to input information. Data (for example, voice data or image data) is obtained by the input unit 120 and may be analyzed and processed as a user's control command.

The input unit 120 is for inputting sound information (or signal), data, or information input from a user. The microphone 122 processes an external sound signal into electric voice data. The processed voice data may be variously utilized according to a function being performed in the apparatus for recording audio information (or an application program being executed). If desired, the microphone 122 may include assorted noise removing algorithms to remove unwanted noise generated in the course of receiving the external audio.

The user input unit 123 is a component that permits input by a user. Once information is input through the user input unit 123, the controller 180 may control an operation of the apparatus for recording audio information 100 in correspondence to the input information. The user input unit 123 may include a mechanical input element and a touch input element.

The memory 170 is typically implemented to store data to support various functions or features of the apparatus for recording audio information 100. For instance, the memory 170 may be configured to store application programs executed in the apparatus for recording audio information 100, data or instructions for operations of the apparatus for recording audio information 100, and the like. Some of these application programs may be downloaded from an external server via wireless communication. Other application programs may be installed within the apparatus for recording audio information 100 at time of manufacturing or shipping, which is typically the case for basic functions of the apparatus for recording audio information 100 (for example, a function to record audio information). It is common for application programs to be stored in the memory 170, installed in the apparatus for recording audio information 100, and executed by the controller 180 to perform an operation (or function) for the apparatus for recording audio information 100.

Apart from the operations associated with application programs, the controller 180 typically controls the overall operation of the audio information recording apparatus 100. The controller 180 may record input audio signals for a desired length of time, or provide appropriate information (e.g., recorded audio data) or functions to the user or handle them, by processing signals, data, information, etc. input and output through the above-described components or running an application program stored in the audio information recording apparatus 100.

Moreover, the controller 180 may control at least some of the components described in conjunction with FIG. 1, in order to run an application program stored in the memory 170. Furthermore, the controller 180 may operate at least two of the components included in the audio information recording apparatus 100 in combination.

The audio information recording apparatus 100 is shown having wireless communication unit 110 configured with several commonly implemented components. For instance, the wireless communication unit 110 typically includes one or more components which permit wireless communication between the audio information recording apparatus 100 and a wireless communication system or network within which the audio information recording apparatus 100 is located.

The wireless communication unit 110 typically includes one or more modules which permit communications such as wireless communications between the apparatus for recording audio information 100 and a wireless communication system, communications between the apparatus for recording audio information 100 and another device for example a mobile terminal, communications between the apparatus for recording audio information 100 and an external server. Further, the wireless communication unit 110 typically includes one or more modules which connect the apparatus for recording audio information 100 to one or more networks. To facilitate such communications, the wireless communication unit 110 includes one or more of a wireless Internet module 113, a short-range communication module 114, and a location information module 115.

The wireless Internet module 113 is configured to facilitate wireless Internet access. This module may be internally or externally coupled to the apparatus for recording audio information 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), and the like. The wireless Internet module 113 may transmit/receive data according to one or more of such wireless Internet technologies, and other Internet technologies as well.

The location information module 115 is generally configured to detect, calculate, derive or otherwise identify a position of the apparatus for recording audio information. As an example, the location information module 115 includes a Global Position System (GPS) module or a Wi-Fi module. As one example, when the apparatus for recording audio information uses a GPS module, a position of the apparatus for recording audio information may be acquired using a signal sent from a GPS satellite. As another example, when the apparatus for recording audio information uses the Wi-Fi module, a position of the apparatus for recording audio information can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the apparatus for recording audio information. The location information module 115 for obtaining a position (or current position) of the apparatus for recording audio information is not limited to a module for directly calculating or acquiring a position of the apparatus for recording audio information.

At least some of the above components may operate in a cooperating manner, so as to implement an operation, a control or a control method of the apparatus for recording audio information 100 according to various embodiments to be explained later. The operation, the control or the control method of the apparatus for recording audio information 100 may be implemented on the apparatus for recording audio information image 100 by driving at least one application program stored in the memory 170.

Meanwhile, the controller 180 of the audio information recording apparatus 100 according to an exemplary embodiment of the present invention may record audio data input through the microphone 122 under the user's control. Moreover, the controller 180 may extract keywords by analyzing recorded audio data and generate image data corresponding to the extracted keywords. Furthermore, the controller 180 may generate tags comprising the image data and display them to correspond to the recorded audio data.

Figure 2:
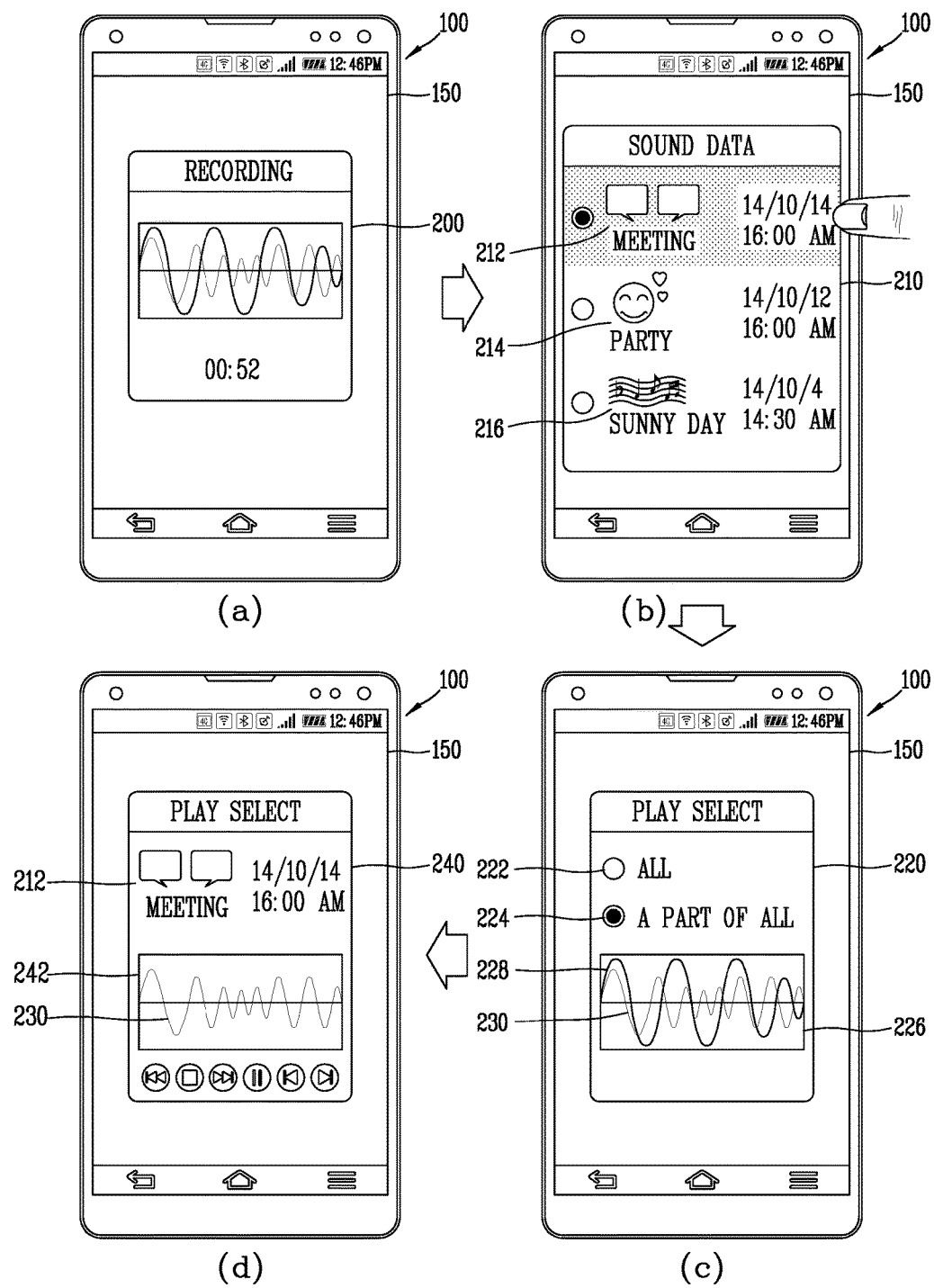
FIG. 2 is an illustration of an example in which an audio information recording apparatus according to an exemplary embodiment of the present invention records audio data and plays it when selected by a user.

FIG. 2 shows an example in which an audio information recording apparatus according to an exemplary embodiment of the present invention records audio data and plays it when selected by a user.

Once audio data is recorded under the user's control, as shown in (a) of FIG. 2, the controller 180 may display the recorded audio data as keyword and image data, as shown in (b) of FIG. 2, by using keywords extracted from the recorded audio data.

For example, a keyword may be extracted from a text string that is created through voice-to-text (VTT) processing on the recorded audio data. In an example, the controller 180 may extract, as the keyword, a word that occurs more than a certain number of times, or, if the recognized text string contains more than a set number of user-specified words, the controller 180 may extract, as the keyword, a preset representative word corresponding to the user-specified words. Alternatively, if the recognized text string contains a specific word, other words corresponding to it may be extracted as the keyword. Alternatively, if the user has a preset schedule, the controller 180 may extract a keyword from the schedule information. Besides, if the recorded audio data is a melody with a certain rhythm and pitch, the keyword may be the title of the melody which is retrieved through music search results.

Meanwhile, the image data may be determined in various ways. For example, the image data may be associated with a keyword. For a keyword "meeting" or "conference", for example, image data may be generated that comprises at least one graphical object (e.g., speech-bubble-shaped graphical object) 212 corresponding to the keyword "meeting" or "conference" may be generated. Alternatively, if the recorded audio data comprises a melody, the image data may comprise corresponding graphical objects (e.g., graphical objects of notes and musical notation) 216.

Alternatively, the image data may be determined by the results of detecting the surroundings of the audio information recording apparatus 100. For example, the image data may comprise a graphical object 214 corresponding to the user's emotional state (e.g., a smiley face) which is determined by the results of detection by the sensing unit 140 of the audio information recording apparatus 100—that is, the results of detecting the user's biological signal. Alternatively, the image data may of course comprise a graphical object corresponding to the current location of the user.

Such image data may be generated according to keywords extracted from recorded audio data, according to the type of audio data, or according to a set order of priority. For example, if a keyword is extracted from recorded audio data, the controller 180 may retrieve a corresponding graphical object and generate image data comprising the retrieved graphical object. Moreover, the controller 180 may combine the extracted keyword and the image data to create tags for the recorded audio data.

Thus, if the extracted keyword is "meeting", the controller 180 may generate image data comprising a speech-bubble-shaped graphical object corresponding to the keyword "meeting", as shown in (b) of FIG. 2. Moreover, the controller 180 may create a first tag 212 comprising the keyword "meeting" and the generated image data.

Meanwhile, if the recorded audio data is a melody with a certain pitch and rhythm, the controller 180 may extract, as the keyword, the title of the song, "Sunny Day", which is retrieved through a music search. In this case, the controller 180 may generate image data comprising graphical objects which represent the audio data in the form of musical notation with notes. Moreover, the controller 180 may generate a third tag 216 comprising the keyword "Sunny Day" and the generated image data.

According to the above description, the audio information recording apparatus 100 according to the exemplary embodiment of the present invention may of course display the user's emotional state as image data corresponding to the recorded audio data. For example, the controller 180 may determine the user's emotional state based on the user's heart rate, body temperature, blood flow, etc. which are detected by the sensors of the sensing unit 140. In this case, the controller 180 may display a graphical object corresponding to the most dominant emotional state (e.g., the emotion that lasts the longest), among the user's emotional states that have been determined during recording of the audio data.

Meanwhile, the controller 180 may determine the type of image data corresponding to the recorded audio data according to a set order of priority or when selected by the user. For instance, the controller 180 may classify the audio data as highest priority depending on the situation the audio data was recorded in, and, if the audio data was recorded in a situation other than specified ones, may determine the type of the image data according to whether the audio data comprises a melody or depending on the user's emotional state. In this case, if the results of analysis of the recorded audio data show that the recorded audio data was recorded at a "meeting" or "conference", the controller 180 may extract a keyword "meeting" for the recorded audio data, and generate corresponding image data, even if the audio data comprises a melody or the user is in a specific emotional state.

On the other hand, if the results of analysis of the recorded audio data show that the recorded audio data was recorded in a situation other than specified ones (e.g., at a meeting or conference), the controller 180 may detect whether the recorded audio data comprises a melody or not. If the recorded audio data comprises a melody, it may be identified as a melody. In this case, the controller 180 may display the same image data as in the third tag 216, corresponding to the recorded audio data.

If it is determined that the audio data does not comprise a melody, or if the duration of a melody, if any, is less than a preset amount of time, or if the intensity of a melody sound signal included in the audio data is weak—say, less than a preset level, the controller 180 may determine that the audio data does not involve a melody. In this case, the controller 180 may display a graphical object corresponding to the user's emotional state as image data, as can be seen in the second tag 214 of (b) of FIG. 2.

As explained above, apart from the situation the audio data was recorded in, whether the audio data comprises a melody or not, and the user's emotional state detected at the time of recording the audio data, the controller 180 may of course determine the type of image data to be displayed with respect to the audio data based upon other various criteria.

Meanwhile, the controller 180 may analyze the audio data and sort it according to various criteria at the time of recording the audio data. For example, the controller 180 may distinguish the audio data according to agent. That is, the controller 180 may distinguish different voices of individual participants of a "meeting" in the audio data, based on the frequency and pitch of the voices. Similarly, the controller 180 may distinguish sounds of different musical instruments in a "melody" by the unique timbres of different musical instruments stored in the memory 170. Alternatively, the controller 180 may recognize the recorded audio data as being divided into a plurality of discrete segments, based on the user's emotional states which are determined during recording of the audio data.

Thus, the controller 180 may display the graphic objects included in the image data in a way that reflects the number of recognized agents. That is, if there are two participants, i.e. If more than two voices are detected at the meeting, image data comprising corresponding graphical objects, i.e., two speech bubbles, may be displayed as in the first tag 212 of (b) of FIG. 2. In this way, the user may intuitively figure out the keyword and the number of participants (agents) in the "meeting", just by checking the tags for the recorded audio data.

Meanwhile, when a recording is selected from the audio data, the controller 180 may play the selected recording. In this case, the controller 180 may play the entire or part of the selected recording. Here, part of the selected recording may be audio data generated from a specific agent (e.g., a specific person's voice or a specific musical instrument's sound) or a segment corresponding to a specific emotional state of the user.

(c) and (d) of FIG. 2 show an example in which audio data recorded at a "meeting" is selected by the user and played. For example, when the audio data is selected to be played, that is, the user selects to play all 222 or a part of all 224, then the controller 180 may display graphical objects 226 on the display unit 151 to represent the voices of different agents, i.e., different persons 228 and 230, that are included in the audio data, as shown in (c) of FIG. 2.

In this case, the user may select the voice of a specific agent through the graphical object 226, and the controller 180 may extract and play the voice of the person the user has selected from the audio data. (d) of FIG. 2 shows an example in which the voice 230 of a specific person selected by the user is extracted and played from the audio data corresponding to the first tag 212 selected by the user.

Various exemplary embodiments below may be implemented in a recording medium that can be read by a computer or a similar device using software, hardware, or a combination of both, for example.

Hereinafter, exemplary embodiments relate to a control method that may be implemented in the audio information recording apparatus 100 thus configured will be described with reference to the accompanying drawings. It will be apparent to those skilled in the art that the present invention can be implemented into various specific forms without departing from the spirit and essential features of the present invention.

Figure 3:
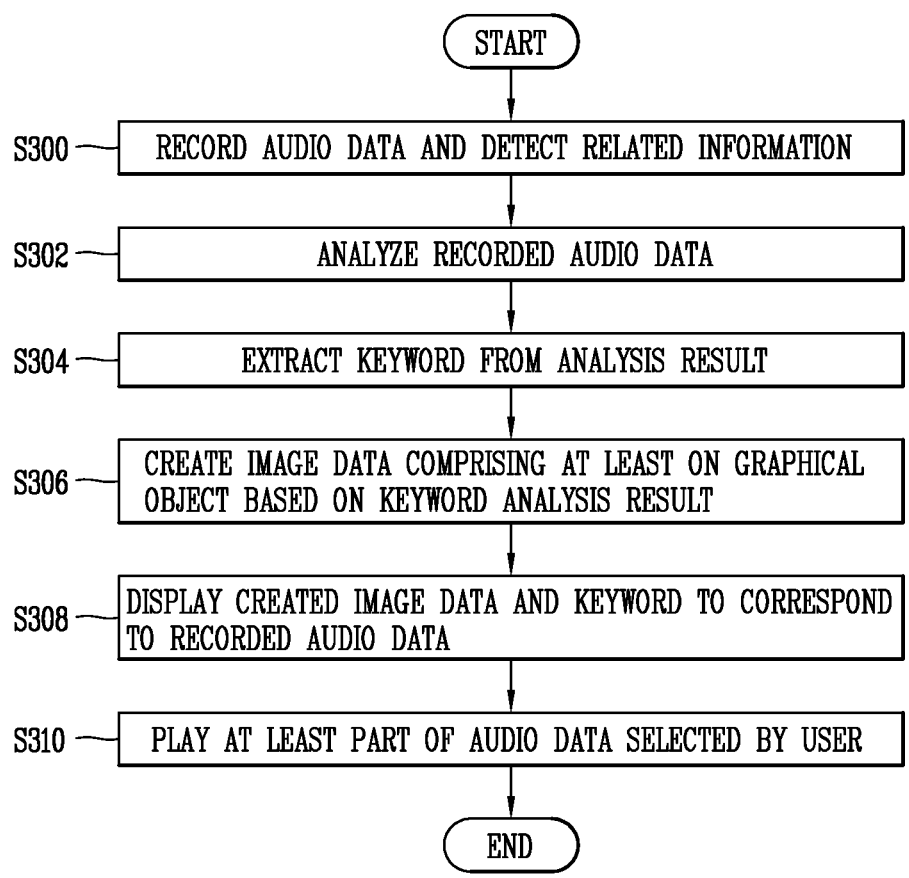
FIG. 3 is a flowchart illustrating an operation process in which the audio information recording apparatus according to the exemplary embodiment of the present invention creates tags for recorded audio data and plays the audio data.

FIG. 3 is a flowchart illustrating an operation process in which the audio information recording apparatus according to the exemplary embodiment of the present invention creates tags for recorded audio data and plays the audio data.

Referring to FIG. 3, when the users selects to record audio data, the controller 180 of the audio information recording apparatus according to the exemplary embodiment of the present invention records input audio data and detects related information (S300). Here, the related information may be diverse.

For example, the related information may be information about the current time and location. In this case, the controller 180 may recognize the current situation of the user from stored user schedule information, based on the information about the current time and location. That is, if the current time and location of the user match a time and location included in the schedule information, the controller 180 may determine that the user is in a situation corresponding to the preset schedule. In this case, the controller 180 may detect information related to the preset schedule as the related information.

Meanwhile, the related information may be information about the user's biological signal. That is, the related information may be at least one among the heart rate, body temperature, blood flow, respiratory strength, and respiratory rate of the user. The controller 180 may determine various emotional states of the user based on the result of detecting the user's biological signal. For example, the controller 180 may determine whether the user is happy, sad, excited, or concentrating, based on the result of detecting the user's biological signal.

Once related information is detected along with recording audio data in the step S300, the controller 180 may analyze the audio data based on the related information (S302). For example, in the step S300, the controller 180 may analyze the type of the recorded audio data. That is, if the recorded audio data comprises more than a preset amount of melody, the controller 180 may determine that the audio data is a melody, and if the recorded audio data comprises audio signals which are identified as human voice, the controller 180 may determine that the audio data is a voice recording of a conference, meeting, etc.

The controller 180 may sort the audio signals included in the audio data recorded in the step S302, according to the agent the audio signals come from. For example, if the audio data comprises a plurality of human voices, the controller 180 may distinguish the voices by the agent, i.e., person, the audio signals in the audio data come from. On the other hand, if the audio data comprises a melody, the controller 180 may sort audio signals from different musical instruments in the audio data by distinguishing the timbres of the musical instruments used to play the melody. Here, information about the timbres of the musical instruments may be pre-stored in the memory 170.

Of course, the agents of audio signals in the recorded audio data may be distinguished only when the intensity of the audio signals is higher than a certain level. For audio data recorded of a conversation, the controller 180 may recognize the agents of audio signals only when the audio signals come from people whose voice volume is higher than a certain level. Similarly, if the audio data is a recording of a melody, the controller 180 may recognize instrumental sounds included in the melody only when the instrumental sounds last longer than a certain length of time or the sound volume is higher than a certain level, and of course, the controller 180 may distinguish the recognized instrumental sounds from one another.

Apart from the agents of audio signals, the controller 180 may divide the audio data into a plurality of types of audio data based on the user's emotional states which are determined during recording of the audio data. That is, the controller 180 may match the user's emotional states determined during recording of the audio data to separate time slots of the audio data, and recognize the audio data separately according to the user's emotional states corresponding to the time slots of the audio data.

The related information may comprise user location information. In this case, the controller 180 may match the user's locations detected during recording of the audio data to the time slots of the audio data. If the user moves to other locations during recording of the audio data, the controller 180 may of course recognize the user's location corresponding to each time slot of the audio data.

Once the recorded audio data is analyzed based on the detected related information in the step S302, the controller 180 may extract a keyword from the recorded audio data in the step S304. Here, the keyword may be extracted in various ways. For example, the controller 180 may extract the keyword based on the result of VTT (Voice-To-Text) recognition of the recorded audio data. In this case, the controller 180 may extract the keyword from among words in a text string which is created as a result of VTT recognition of the recorded audio data. In an example, if a word occurs more than a certain number of times or most frequently in the text string, the controller 180 may extract it as the keyword. Alternatively, if the text string contains a preset specific word (e.g., "speech", "instruction", "president", or "director") or phrase (e.g., "Now the president is going to make a speech" or "Now the director is going to give instructions"), the controller 180 may extract this specific word or phrase as the keyword for the text string.

Alternatively, if a user-specified word is contained in the text string, the controller 180 may extract a corresponding representative word as the keyword for the text string. An example of the representative word corresponding to this word is as shown in Table 1 below.

TABLE 1

| Words | Representative Word |
|---|---|
| Invention | Patent meeting |
| Patent | |
| Inventor | |
| Patent right | |
| Claim | |
| . . . | |

As shown in the above Table 1, the user may set specific words (invention, patent, inventor, etc.) in advance, and may set a representative word "patent meeting". In this case, if these words—invention, patent, inventor, patent right, and claim—are contained in a text string which is created as a result of VTT of the current recorded audio data or they occur more than a certain number of times, the controller 180 may extract a keyword "patent meeting" corresponding to the recorded audio data.

Alternatively, the controller 180 may use preset user schedule information in order to extract a keyword for the audio data. In this case, if the current time and location of the user match a time and place included in the schedule information, the controller 180 may determine that the user is on a schedule corresponding to the preset schedule information. Then, the controller 180 may extract a keyword for the recorded audio data based on the schedule information.

Once a keyword for the audio data currently being recorded is extracted in the step S302, the controller 180 may generate image data corresponding to the extracted keyword (S306). This image data may be determined according to the type of the recorded audio data. For example, if the audio data comprises a plurality of human voices, the controller 180 may generate image data comprising a graphical object (e.g., speech bubble) corresponding to the human voices. Alternatively, if the audio data comprises a melody, the controller 180 may generate image data comprising a graphical object (e.g., musical notation and multiple notes) corresponding to the melody.

Here, the image data may comprise one or more different graphical object, and the graphical objects may reflect different agents of audio signals. For example, if the recorded audio data comprises a plurality of human voices, the image data may comprise as many graphical objects as the number of agents of the voices, i.e., the number of speakers. Thus, if the audio data is a recording of a meeting involving two people, the controller 180 may generate image data comprising two speech bubbles.

Once such image data is generated, the controller 180 may create tags for the recorded audio data by using the generated image data and the keyword (S308). For example, if the audio data is a recording of a meeting involving two people as described above, the controller 180 may create tags for the recorded audio data by using image data comprising two speech bubbles and a keyword (e.g., "patent meeting") for the conference. Then, the tags may be displayed on the display unit 151 to correspond to the recorded audio data. An example in which tags for recorded audio data are created and displayed on the display unit 151 will be described with reference to FIG. 6 below.

When tags for the recorded audio data are displayed, the controller 180 may play the audio data as selected by the user. In this case, the controller 180 may of course play the entire or part of the recorded audio data (S310).

Figure 4:
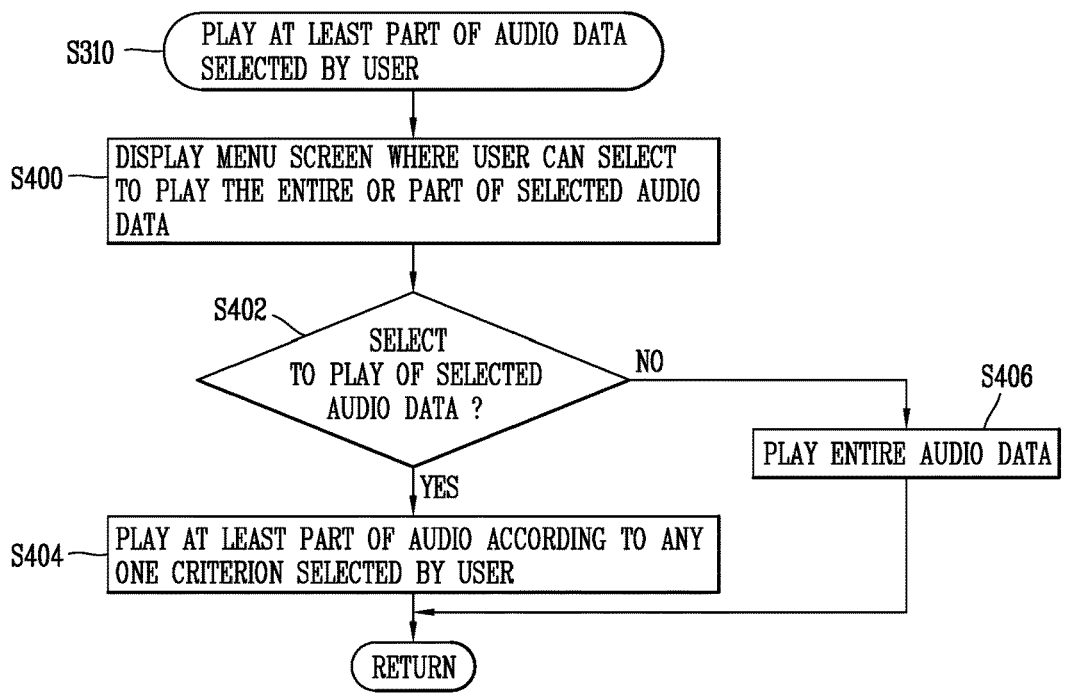
FIG. 4 is a flowchart illustrating an operation process in which the audio information recording apparatus according to the exemplary embodiment of the present invention plays audio data selected by the user.

FIG. 4 illustrates in more detail an operation process, i.e., the step S310, in which the audio information recording apparatus according to the exemplary embodiment of the present invention plays audio data selected by the user.

Referring to FIG. 4, when the user selects audio data to play, the controller 180 of the audio information recording apparatus according to the exemplary embodiment of the present invention may display a menu screen where the user can select to play the entire or part of the selected audio data (S400). The controller 180 may then detect whether the user has selected to play a part of the selected audio data (S402). If the user has selected to play the entire audio data, the entire audio data may be played (S406).

If the user has selected to play a part of the audio data in the step S402, they may choose a criterion for playing a part of the selected audio data. In this case, a plurality of graphical objects related to the selected criterion may be displayed on the display unit 151. Through the displayed graphical objects, a part of the selected audio data may be played according to the selected criterion (S404).

For example, the user may choose the agent of a particular audio signal as a criterion for playing a part of the audio data. That is, as shown in (c) of FIG. 2, the controller 180 may show distinct states according to the agent of each audio signal or according to a set criterion for distinction, based on the results of analysis of the selected audio data, by using at least one graphical object. Then, the controller 180 may play the corresponding part of the audio data when the user selects at least one graphical object of the corresponding distinct state.

Thus, in the present invention, if the recorded audio data comprises a plurality of human voices, the voice of a specific person may be extracted and played when the user selects it. Similarly, if the recorded audio data comprises a melody, audio data of a specific one of the musical instruments that played the melody may be selectively played.

On the other hand, the user may choose the user's emotional state or detected location as a criterion for playing a part of audio data. In this case, the controller 180 may display on the display unit 151 graphical objects corresponding to the user's emotional states or user's locations which are determined during recording of the audio data. The user may select a specific emotional state or specific location through the corresponding graphical object. In this case, the audio information recording apparatus 100 according to the exemplary embodiment of the present invention may play the corresponding segment which was recorded when the user was in that specific emotional state or in that specific location.

The controller 180 may of course play a part of the audio data based on a plurality of words included in the audio data. For example, the controller 180 may display on the display unit 151 at least one graphical object corresponding to words which have been analyzed in the step S302 as occurring more than a certain number of times. When one of these words is selected, the controller 180 may play segments comprising an audio signal corresponding to the selected word (e.g., for 5 seconds before and after the recording of the audio signal corresponding to that word).

Accordingly, the present invention allows the user to listen to only a part they want from the audio data, —like the voice of a specific person, the sound of a specific musical instrument, a specific emotional state of the user, a location of the user, or specific words. Referring to FIGS. 7A, 7B,7C, and 7D below, an example in which the user chooses a criterion for playing part of the recorded audio data will be described in more detail.

Meanwhile, the controller 180 of the audio information recording apparatus 100 according to the exemplary embodiment of the present invention may perform a search on the audio data based on search data input by the user, using the results of analysis of the recorded audio data. In this case, the controller 180 may perform a search on audio recordings, based on a keyword, a specific musical instrument, a specific person, a specific emotional state, or a recorded melody.

Figure 5:
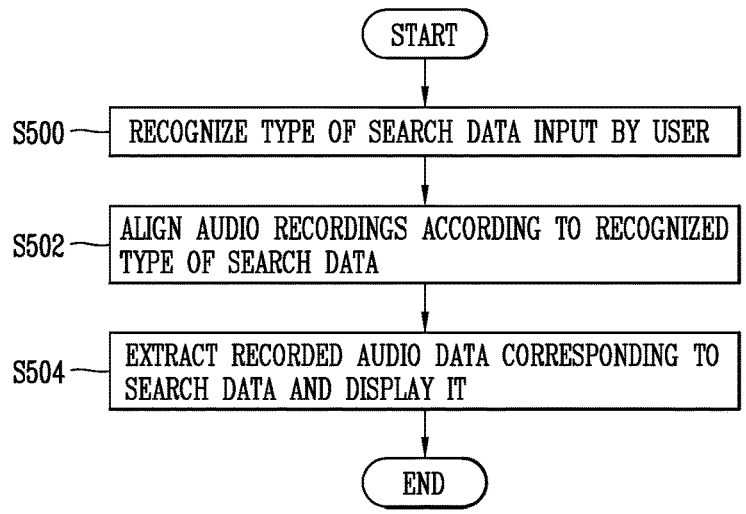
FIG. 5 is a flowchart illustrating an operation process in which the audio information recording apparatus according to the exemplary embodiment retrieves audio data based on input search data.

FIG. 5 illustrates an operation process in which the audio information recording apparatus according to the exemplary embodiment retrieves audio data based on input search data.

Referring to FIG. 5, the controller 180 of the audio information recording apparatus 100 according to the exemplary embodiment of the present invention recognizes the type of search data input by the user (S500). Here, the search data may be a text string input by the user or audio data (e.g., a melody) recorded under the user's control. Alternatively, the search data may be information about a specific emotional state of the user or about the number of participants in a conversation.

In the step S500, the controller 180 may align stored audio recordings according to the result of recognizing the type of the input search data (S502). For example, if the input search data is a text string, the controller 180 may align the stored audio recordings by keyword, and if the input search data is a recorded melody, only audio recordings comprising the melody may be extracted.

Alternatively, if the input search data is the user's emotional state or the user's location, the stored audio recordings may be aligned according to the user's emotional state or the user's location. For example, the controller 180 may align the audio recordings depending on which is the dominant emotional state. Here, the dominant emotional state may refer to the user's emotion that lasts the longest during recording of the audio data. That is, if it is determined that the user was "happy" for 8 minutes and "sad" for 2 minutes at the time of recording audio data which is 10 minutes long, the dominant emotional state of the user corresponding to the audio data may be "happy". Similarly, if the user moves to other locations during recording of audio data, the controller 180 may determine the primary location of the user corresponding to the audio data, depending on which location the user was in for the longest time. Then, the controller 180 may align the stored audio recordings according to the dominant emotional state of the user or the primary location of the user.

Once the stored audio recordings are aligned, the controller 180 may extract audio data corresponding to the search data from the aligned audio recordings and display them (S504). Thus, the controller 180 may retrieve audio data at least partially corresponding to the search data (keyword, number of people, emotional state, location, etc.) selected by the user and display it on the display unit 151.

Meanwhile, the controller 180 may of course provide a people search feature using voice recognition capability. For example, if voice recognition is provided to recognize a specific person's voice, the controller 180 may retrieve images of the person with the recognized voice from stored profiles, Who's Who directories, telephone directories, etc. In this case, the controller 180 may receive from the user any one of those images of the person as the search data. When the user selects a specific person, the controller 180 may of course retrieve an audio recording of that person's voice and display it on the display unit 151.

In the above description, the operation process of the audio information recording apparatus 100 according to the exemplary embodiment of the present invention has been discussed in detail with reference to the flowcharts.

The following description will be given in more detail of an example in which the audio information recording apparatus 100 according to the exemplary embodiment of the present invention displays recorded audio data and an example in which recorded audio data is played or retrieved, with reference to illustrations. In what follows, a description will be given on the assumption that the audio information recording apparatus 100 according to the exemplary embodiment of the present invention is a mobile terminal such as a smart phone. However, the present invention is not, of course, limited to this. That is, it is obvious that the present invention may be implemented on other types of mobile phones and fixed terminals, as well as on smartphones.

FIG. 6 is an illustration of an example in which the audio information recording apparatus according to the exemplary embodiment of the present invention displays recorded audio data along with image data.

The audio information recording apparatus 100 according to the exemplary embodiment of the present invention may record audio data which is received under the user's control. (a) of FIG. 6 shows an example of a corresponding screen which is displayed on the display unit 151 of the audio information recording apparatus 100 according to the exemplary embodiment. In this case, as shown in (a) of FIG. 6, the controller 180 may display on the display unit 151 a graphical object 600 related to the frequency waves of audio data being recorded. Along with this, the controller 180 may display on the display unit 151 a graphical object 602 related to volume adjustment so that the user can adjust the volume of the audio data being recorded. Of course, the controller 180 may detect a variety of related information as well, such as the user's emotional state, location, etc. at the time of recording audio data.

Once audio data is recorded, the controller 180 may analyze the recorded audio data. In this case, as shown in (b) of FIG. 6, the controller 180 may display on the display unit 151 a screen 610 related to the results of analysis of the recorded audio data. The result screen 610 may show a keyword extracted from the current audio data, the number of agents of audio signals recognized from the audio data, and so on. For example, in a case where the audio data was recorded during a meeting between two people, the controller 180 may extract a keyword "meeting" depending on what the recording is about, and recognize and display "two people" as the agents of the audio signals. (b) of FIG. 6 shows an example of this.

The user may select how to display the agents of the audio signals on the result screen 610. For example, if the agents of the audio signals comprise two people, the controller 180 allows the user to select either speech-bubble-shaped graphical objects 612, or human-shaped graphical objects 614, or a graphical object 616 with a plurality of waves corresponding to different people's voices, as shown in (b) of FIG. 6. Of course, the graphical objects may reflect the number of agents of the audio signals. That is, if there are two agents as shown in (b) of FIG. 6, two speech bubbles, two personal images, or two frequency waves may be displayed as shown in (b) of FIG. 6. Otherwise, if there is one voice agent or there are no fewer than three voice agents, it is needless to say that graphical objects comprising one or no fewer than three speech bubbles, one or no fewer than three personal images, or one or no fewer than three frequency waves may be displayed on the display unit 151 and selected by the user.

Meanwhile, if one of these graphical objects 612, 614, and 616 is selected by the user, the controller 180 may generate image data corresponding to the recorded audio data by a method selected by the user. (c) and (d) of FIG. 6 shows an example of this.

That is, as shown in (b) of FIG. 6, if the user selects the speech-bubble-shaped graphical objects, the controller 180 may generate image data comprising at least one speech-bubble-shaped graphical object. Moreover, the controller 180 may create a tag 622 comprising the extracted keyword "meeting" and the generated image data and display it to correspond to the current recorded audio data. (c) of FIG. 6 shows an example of this.

Meanwhile, apart from what is shown in (c) of FIG. 6, the controller 180 may further a display graphical object (volume graphical object) for displaying the recording volume level of the audio data. In this case, the controller 180 may display volume graphical objects near created tags, and the volume graphical objects may be displayed in different forms depending on the recording volume level of the audio data.

That is, as shown in (d) of FIG. 6, if the volume graphical objects 632 and 634 respectively corresponding to the first tag 622 and second tag 624 are different from each other, then they may indicate that the audio data corresponding to the first tag 622 and second tag 624 may have different recording volume levels. Accordingly, when the recording volume levels are displayed as in (d) of FIG. 6, the user may recognize that the audio data corresponding to the first tag 622 has a higher recording volume level than the audio data corresponding to the second tag 624.

FIGS. 7A, 7B, 7C, and 7D illustrate examples in which the audio information recording apparatus according to the exemplary embodiment of the present invention displays graphical objects corresponding to a part of recorded audio data and plays that part of the recorded audio data.

Figure 7A:
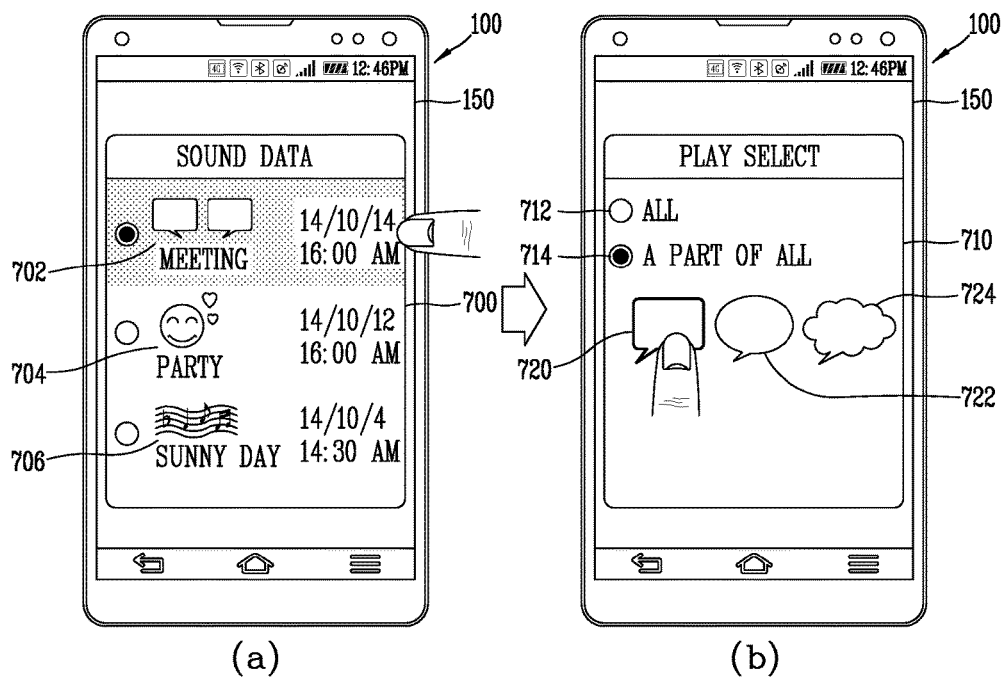

FIG. 7A illustrates that the user is selecting to play a part of audio data recorded during a meeting or conference, among stored audio recordings. For example, as shown in (a) of FIG. 7A, if the user selects audio data recorded during a meeting or conference, that is, audio data comprising a plurality of human voices, then the controller 180 may display a menu screen 710 where the user can select to play the entire or part of the selected audio data, as shown in (b) of FIG. 7A. If the user selects to play a part of all on the menu screen 710, then the controller 180 may display on the display unit 151 graphical objects 720, 722, and 724 corresponding to different agents, i.e., people, who are recognized from the audio data.

Here, the graphical objects 720, 722, and 724 may correspond to the agents of different audio signals, respectively. That is, if the currently selected audio data comprises the voices of three people (person A, person B, and person C), the controller 180 may display on the display unit 151 three different graphical objects 720, 722, and 724 corresponding to the respective voice agents. In this case, the user may select one of the graphical objects, and when the first graphical object 720 is selected as shown in (b) of FIG. 7A, the controller 180 may extract the voice of the agent, i.e., person A, corresponding to the first graphical object 720 and play it.

Figure 7B:
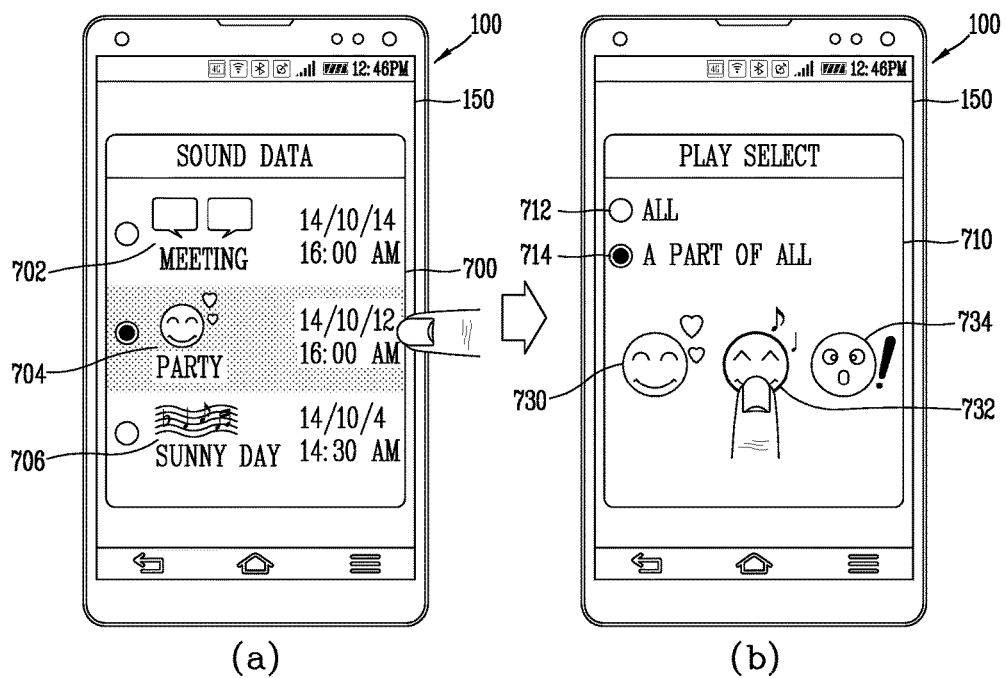

FIG. 7B illustrates an example in which a graphical object representing the user's emotional state as image data is selected. In this case, the controller 180 may display a menu screen 710 where the user can select the entire or part of the selected audio data. If the user selects to play a part of all on the menu screen 710, then the controller 180 may display on the display unit 151 graphical objects 730, 732, and 734 corresponding to different emotional states of the user which are recognized during recording of the audio data.

In this case, the user may select one of the graphical objects, and when the second graphical object 732 is selected as shown in (b) of FIG. 7B, the controller 180 may extract a segment of the audio data during which the user's emotional state corresponding to the second graphical object 732 is "happy" and then play it.

FIG. 7C illustrates that the user is selecting to play a part of an audio recording of a melody, among stored audio recordings. For example, as shown in (a) of FIG. 7C, if the user selects an audio recording of a melody, then the controller 180 may display a menu screen 710 where the user can select to play the entire or part of the selected audio data, as shown in (b) of FIG. 7C. If the user selects to play a part of all on the menu screen 710, then the controller 180 may display on the display unit 151 graphical objects 740, 722, and 744 corresponding to different agents who are recognized from the audio data. Here, the agents of audio signals may be musical instruments, and therefore the graphical objects 40, 742, and 744 corresponding to the different musical instruments may be displayed on the display unit 151, as shown in (b) of FIG. 7C.

In this case, the user may select one of the graphical objects, and when the first graphical object 740 is selected as shown in (b) of FIG. 7C, the controller 180 may extract the voice of the agent, i.e., musical instrument A, corresponding to the first graphical object 740 from the audio data and play it.

FIG. 7D illustrates an example in which audio data corresponding to a list of image data is selected. For example, the results of analysis of recorded audio data show that the audio data contains words that repeat more than a preset number of times or important words specified by the user, then the controller 180 may generate a list of image data, as shown in (a) of FIG. 7D. Moreover, the controller 180 may extract segments containing the words that repeat more a preset number of times or the user-specified words from the audio data and play them.

(b) of FIG. 7D illustrates an example of this. That is, as shown in (b) of FIG. 7D, the controller may display a menu screen 710 where the user can select the entire or part of selected audio data. If the user selects to play a part of all on the menu screen 710, then the controller 180 may display on the display unit 151 specific words 750 which are recognized from the audio data. In this case, the user may select one of those words, and when the user selects one of the words, the controller 180 may extract segments of the audio data based on the time at which the audio data corresponding to the selected word is played. For example, segments (each 5 seconds long) of the audio data corresponding to the selected word may be played before and after the playing of the audio data.

Accordingly, the present invention allows the user to selectively listen to segments of the audio data which comprise a user-specified word or important word (for example, one that repeats more than preset number of times).

FIG. 8 illustrates examples of search data input by the user, in the audio information recording apparatus according to the exemplary embodiment of the present invention.

Referring to FIG. 8, FIG. 8 illustrates examples of a variety of search data that may be input by the user. For example, the search data may be text data, as shown in (a) of FIG. 8. In this case, the controller 180 may retrieve stored audio data comprising text input by the user. For example, the controller 180 may retrieve audio data comprising text input as the search data from among the keywords for the stored audio data. Alternatively, the controller 180 may retrieve audio data comprising text input as the search data from a text string recognized through VTT recognition of the stored audio data.

Besides, the name of a specific person or the name of a specific place may be input in the form of text. In this case, the controller 180 may retrieve the audio data corresponding to the name of a specific person or specific place corresponding to the text input. Of course, the controller 180 may compare the user's location, which is detected as information related to the audio data, with the text input to retrieve the audio data recorded in the place corresponding to the text.

Apart from text, the controller 180 may of course use an audio signal recorded under the user's control as the search data. (b) of FIG. 8 illustrates an example of this.

For example, the controller 180 may record an input audio signal under the user's control, as shown in (a) of FIG. 8. Moreover, the controller 180 may retrieve data comprising the recorded audio signal from among stored audio recordings. That is, if the audio signal recorded as the search data is a melody with a certain rhythm, for example, the controller 180 may retrieve audio data comprising the melody corresponding to the search data, from among stored audio recordings comprising a melody.

The controller 180 may of course use the result of VTT recognition of the recorded audio signal. In this case, the controller 180 may retrieve audio data using the text that is recognized from the recorded audio signal. Here, the process of retrieving audio data using text may be similar to direct text input from the user.

Moreover, the controller 180 may of course retrieve audio data based on the user's emotional state. In this case, the controller 180 may display on the display unit 151 a menu screen 820 comprising graphical objects respectively corresponding to different emotional states of the user, as shown in (c) of FIG. 8. Furthermore, audio data that is recorded when the user was in the emotional state corresponding to a graphical object selected by the user may be retrieved from among stored audio recordings. For example, the controller 180 may determine the dominant emotional state for each of the stored audio recordings, and perform a search based on the dominant emotional state.

Besides, the controller 180 may perform a search based on the number of agents of audio signals included in audio data. If the audio data contains a plurality of human voices, as at a meeting or conference, the number of agents of audio signals may represent the number of people. If the audio data contains a melody, the number of agents of audio signals may represent the number of musical instruments used to play the melody.

In this case, the controller 180 may display on the display unit 151 a menu screen where the user can select the number of agents of audio signals. That is, if the user selects the number of people, for example, the menu screen 830 may comprise entries comprising graphical objects representing different numbers of people, as shown in (d) of FIG. 8.

That is, as shown in (d) of FIG. 8, a first entry 832 with one human-shaped graphical object may represent one person, a second entry 834 with two human-face graphical objects may represent two people, a third entry 835 with three human-faced graphical objects may represent three people, and a fourth entry 836 with four human-faced graphical objects may represent four people. In this case, if the user selects the second entry 834, as shown in (d) of FIG. 8, the controller 180 may retrieve audio data comprising the voices of two people, as represented by the second entry 834, from stored audio recordings.

Accordingly, the present invention allows for easier retrieving of audio data recorded at a conference or meeting a specific number of people participated in. Similarly, the controller 180 may retrieve audio data with a recording of a melody which is played by a specific number of musical instruments.

Although the foregoing description has been made with respect to a case where the recorded audio data comprises a plurality of human voices and the voices of different "persons" are extracted, it will be obvious that the agents of the extracted voices may be identified by recognizing the voices. For example, the controller 180 may identify the agent of a human voice extracted from the audio data by recognizing the voice. In this case, the controller 180 may of course retrieve image data corresponding to the agent of the voice from stored Who's Who directories, telephone directories, or profiles, and display the retrieved data on the display unit 151. In this case, in the present invention, in a case where a conversation is recorded, images of participants in the conversation may be generated as image data corresponding to the recorded audio data, and therefore the user may recognize the recorded audio data more easily and quickly by using the image data.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the apparatus for recording audio information.

The invention claimed is:

1. An apparatus for recording audio information, the apparatus comprising:
a display unit;
an input unit for receiving audio data;
an output unit for outputting audio data;
a sensing unit for detecting at least one between the surrounding environment and biological signals; and
a controller coupled to the display unit, the input unit, the audio output unit, and the sensing unit, the controller configured to:
record received audio data,
extract a keyword from recorded audio data,
generate image data based on at least one between results of analyzing the recorded audio data and results of detection by the sensing unit,
display tags, created by combining the keyword and the image data, to correspond to the recorded audio data,
when any one of the tags is selected by the user, recognize agents of audio signals included in the recorded audio data corresponding to the selected tag,
display on the display unit one or more different graphical objects corresponding to the different agents of audio signals included in the recorded audio data corresponding to the selected tag,
extract, from the recorded audio data corresponding to the selected tag, an audio signal coming from the agent corresponding to a selected one of the graphical objects, and
output the extracted audio signal,
wherein the controller is further configured to:
determine whether the audio data is recorded in a predetermined situation, and
generate the image data corresponding to a situation in which the audio data is recorded when the audio data is recorded in the predetermined situation, or generate the image data according to at least one of the results of analyzing the recorded audio data and the results of detection by the sensing unit according to a predetermined priority when the audio data is not recorded in the predetermined situation.

2. The apparatus of claim 1, wherein, if the recorded audio data comprises a plurality of human voices, the graphical objects comprise at least one human-shaped graphical object, at least one speech-bubble-shaped graphical object, or at least one frequency wave-shaped graphical object, and
wherein, if one is selected from among the human-shaped graphical object, the speech-bubble-shaped graphical object, and the frequency wave-shaped graphical object, the controller extracts the voice of a person corresponding to the selected graphical object from the audio data and outputs the extracted voice.

3. The apparatus of claim 1, wherein the controller distinguishes the agents of a plurality of audio signals in the audio data from one another by timbres and characteristics, and the agents of the audio signals comprise at least one person or musical instrument that generates a voice or sound that is distinguishable by the timbres and characteristics.

4. The apparatus of claim 1, wherein the controller extracts the keyword in different ways depending on the type of the recorded audio data, using the results of analysis of the audio data.

5. The apparatus of claim 4, wherein, if the results of analysis of the audio data show that the audio data comprises a melody with a rhythm, the controller extracts the title of the melody as the keyword for the audio data through a music search.

6. The apparatus of claim 4, wherein, if the results of analysis of the audio data show that the audio data comprises the voice of at least one person, the controller recognizes the recorded audio data as a text string through voice-to-text (VTT) processing and extracts the keyword from the text string.

7. The apparatus of claim 6, wherein, if a word occurs more than a preset number of times or most frequently in the text string, the controller extracts the word as the keyword.

8. The apparatus of claim 6, wherein, if the text string contains a preset specific word or phrase, the controller extracts the specific word or phrase as the keyword.

9. The apparatus of claim 6, wherein, if the text string contains at least one user-specified word, the controller extracts a representative word corresponding to the at least one word as the keyword.

10. The apparatus of claim 1, wherein, if the time of recording the audio data and the current location match a time and location in stored schedule information, the controller extracts the keyword based on the stored schedule information.

11. The apparatus of claim 1, wherein the controller generates image data comprising one or more different graphical objects according to the type of the recorded audio data determined by the result of analysis of the audio data, and
wherein the type of the audio data is determined according to whether the audio data comprises a plurality of human voices or a melody with a rhythm.

12. The apparatus of claim 11, wherein, if the recorded audio data comprises a plurality of human voices, the controller generates image data comprising at least one human-shaped graphical object, at least one speech-bubble-shaped graphical object, or at least one frequency wave-shaped graphical object.

13. The apparatus of claim 12, wherein the controller generates image data comprising as many graphical objects as the number of agents of the voices recognized from the recorded audio data.

14. The apparatus of claim 12, wherein, if there is a distinguishable voice among the plurality of human voices included in the recorded audio data, the controller recognizes the person corresponding to that voice and displays an image corresponding to the recognized person through a graphical object.

15. The apparatus of claim 1, wherein the controller determines the user's emotional state during recording of the audio data, using the results of detection by the sensing unit and the image data comprises a graphical object corresponding to the determined emotional state of the user.

16. The apparatus of claim 1, wherein the controller detects the current location where the audio data is being recorded, extracts information related to the location as the keyword, and displays a tag comprising a graphical object corresponding to the detected location.

17. The apparatus of claim 1, wherein, upon receiving search data, the controller retrieves audio data corresponding to the received search data, and
wherein the search data is one among text, recorded audio data, the user's emotional state, and the current location.

18. The apparatus of claim 17, wherein the search data further comprises data on the number of human voices, and the controller retrieves audio data comprising a specific number of human voices based on the search data, among stored audio recordings comprising a plurality of human voices.

19. The apparatus of claim 1, wherein the image data comprises a graphical object for displaying the recording volume level of the audio data.

20. A method for controlling an audio information recording apparatus, the method comprising:
 recording audio data and detecting at least one between the surrounding environment and biological signals;
 extracting a keyword by analyzing the recorded audio data and recognizing the agents of audio signals included in the audio data;
 generating image data using at least one among the detected surrounding environment the detected biological signals, and the recognized agents of audio signals;
 displaying tags comprising the generated image data and the extracted keyword to correspond to the recorded audio data; and
 when one of the tags is selected, outputting corresponding audio data,
wherein the outputting of audio data comprises extracting, from the audio data, an audio signal corresponding to one selected from among the recognized agents of audio signals and outputting the extracted audio signal,
wherein the generating image data further comprises:
 determining whether the audio data is recorded in a predetermined situation; and
 generating the image data corresponding to a situation in which the audio data is recorded when the audio data is recorded in the predetermined situation, or generating the image data according to at least one of the results of analyzing the recorded audio data and the results of detection by a sensing unit according to a predetermined priority when the audio data is not recorded in the predetermined situation.

* * * * *